United States Patent
Rizzo et al.

(10) Patent No.: US 8,583,179 B2
(45) Date of Patent: Nov. 12, 2013

(54) COMMUNICATION DEVICE COMPRISING A BATTERY AND A NEAR-FIELD COMMUNICATION MODULE

(75) Inventors: Pierre Rizzo, Aix en Provence (FR); Alexandre Charles, Auriol (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 932 days.

(21) Appl. No.: 12/704,212

(22) Filed: Feb. 11, 2010

(65) Prior Publication Data

US 2010/0210300 A1 Aug. 19, 2010

(30) Foreign Application Priority Data

Feb. 13, 2009 (FR) ...................................... 09 50927

(51) Int. Cl.
*H04B 1/38* (2006.01)
(52) U.S. Cl.
USPC .......................... 455/558; 455/41.1; 455/90.1
(58) Field of Classification Search
USPC ............ 455/558, 41.1, 90.1, 552.1, 572, 574, 455/575.7; 200/333, 293, 296
See application file for complete search history.

(56) References Cited

U.S. PATENT DOCUMENTS

| | | | |
|---|---|---|---|
| 6,202,927 B1* | 3/2001 | Bashan et al. ................. | 235/451 |
| 2002/0094841 A1* | 7/2002 | Sakaguchi et al. ............ | 455/558 |
| 2005/0197169 A1* | 9/2005 | Son ............................... | 455/572 |
| 2007/0155443 A1 | 7/2007 | Cheon et al. | |
| 2008/0119229 A1* | 5/2008 | Lee ............................... | 455/558 |
| 2008/0188178 A1 | 8/2008 | Maugars et al. | |
| 2008/0296978 A1* | 12/2008 | Finkenzeller et al. ........ | 307/104 |
| 2009/0312054 A1* | 12/2009 | Choi ............................. | 455/558 |
| 2010/0248653 A1* | 9/2010 | Merlin ......................... | 455/90.1 |
| 2010/0259216 A1* | 10/2010 | Capomaggio ................ | 320/108 |
| 2011/0059694 A1* | 3/2011 | Audic .......................... | 455/41.1 |
| 2011/0237190 A1* | 9/2011 | Jolivet ......................... | 455/41.2 |
| 2011/0263294 A1* | 10/2011 | Kim et al. .................... | 455/558 |
| 2012/0134444 A1* | 5/2012 | Tsukamoto .................. | 375/320 |

FOREIGN PATENT DOCUMENTS

WO WO 2007/011372 A1 10/2007

OTHER PUBLICATIONS

French Search Report dated Oct. 1, 2009 from corresponding French Application No. 09/50927 filed Feb. 13, 2009.

* cited by examiner

*Primary Examiner* — Sujatha Sharma
(74) *Attorney, Agent, or Firm* — Wolf, Greenfield & Sacks, P.C.

(57) ABSTRACT

A mobile telecommunication device including at least one telecommunication circuit; at least one subscriber identification module; at least one assembly including at least one supply battery; and a switch of selection between a power supply of the subscriber identification module by the assembly and by the telecommunication circuit according to the presence or not of a near-field communication module in the assembly.

18 Claims, 3 Drawing Sheets

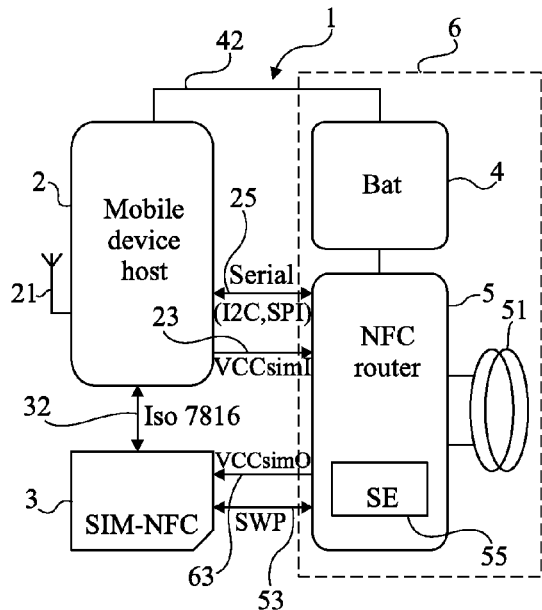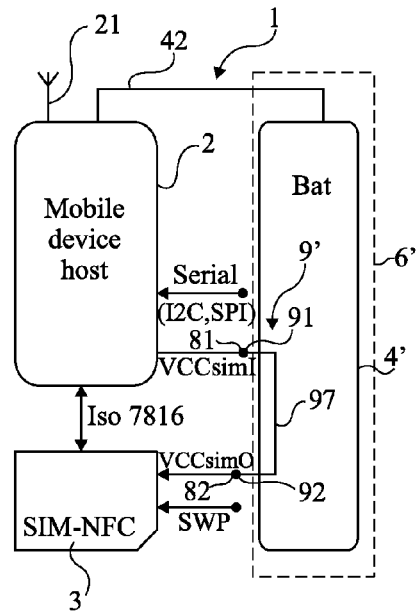
Fig 3A
Fig 3B
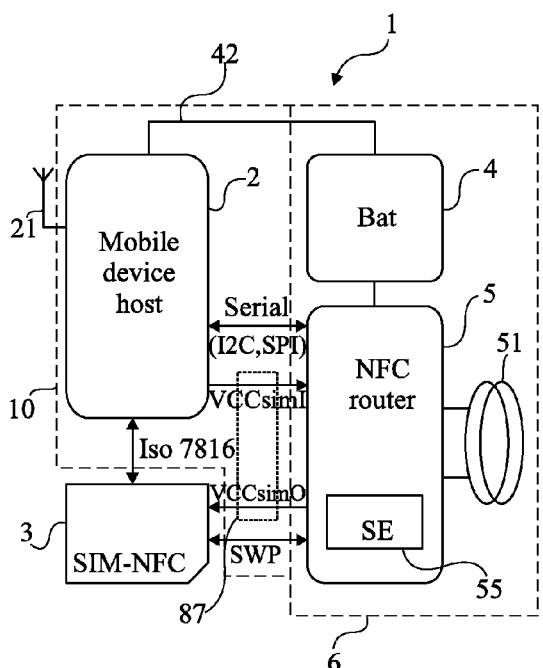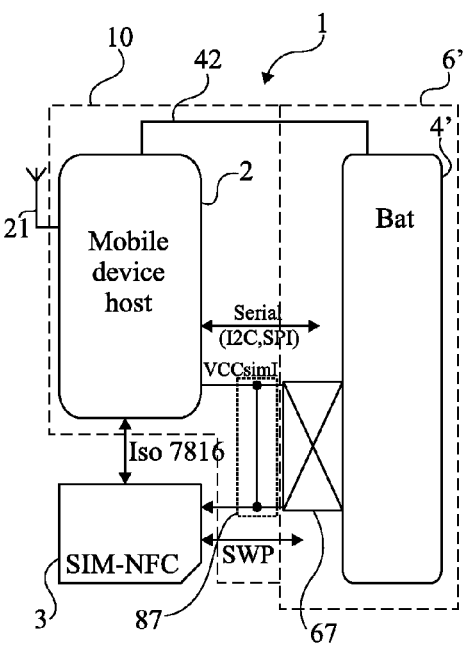
Fig 6A
Fig 6B

COMMUNICATION DEVICE COMPRISING A BATTERY AND A NEAR-FIELD COMMUNICATION MODULE

CROSS REFERENCE TO RELATED APPLICATIONS

This application claims the priority benefit of French patent application number 09/50927, filed on Feb. 13, 2009, entitled "COMMUNICATION DEVICE COMPRISING A BATTERY AND A NEAR-FIELD COMMUNICATION MODULE," which is hereby incorporated by reference to the maximum extent allowable by law.

BACKGROUND OF THE INVENTION

1. Field of the Invention

The present invention generally relates to electronic equipment and, more specifically, to mobile telecommunication devices equipped with a battery. The present invention more specifically applies to such devices capable of establishing, in addition to communications using a mobile telephony network, near-field communications.

2. Discussion of the Related Art

So-called near-field communications are based on small-distance contactless communication protocols between two elements. Such protocols generally use an electromagnetic field generated by one of the elements, called a reader, to supply the other element, called a transponder or card. The remote-supply carrier is also used as a carrier for the communication. Such communication protocols are generally designated by their standard (for example, 14443-A, B JIS, NFC, Forum, ECMA).

Among such protocols, the protocol known as NFC (near field communication) provides for the same communicating module to be able to act either as a contactless reader, or as a contactless card (transponder). According to its operating mode, this dual NFC communication module then exploits the electronic circuits of the device hosting it differently.

The present invention more specifically applies to mobile telecommunication devices capable of supporting the NFC protocol, also known under the references of standards ISO 14443, ECMA 340 and 352, ETSI TS 102 613 (Smart Cards, UICC—Contactless Front-end (CLF) Interface; Part 1: Physical and data link layer characteristics) and ETSI TS 102 622 (Smart Cards UICC—Contactless Front-end (CLF) Interface; Host Controller Interface (HCI)).

In the NFC protocol, the device containing the dual communication device generally is a mobile telecommunication device capable of using a mobile telephony network (of GSM type). For example, it may be a cell phone, a communicating personal digital assistant (PDA), etc.

An aim is to increase the range of application of mobile telephony devices by appending thereto functions which are otherwise reserved to electromagnetic transponders (for example, transport vouchers, electronic purses, etc.). The mobile device then replaces the contactless card used to validate a transaction with a reader (transit control box, electronic purse reader, etc.). The possibility of also communicating over the mobile telephony network enables validating transactions in so-called on-line protocols. Further, the mobile device may also operate as a contactless card reader, for example, to read text data or a URL from a contactless tag supporting the protocols or data formats predefined in the NFC Forum, for example, to recharge a transport voucher or an electronic purse supported by a separate contactless card, by using the telephone network to have the transaction validated, for example, by a bank.

When the device operates in reader mode, its NFC module generates the electromagnetic contactless communication field by drawing the required power from the battery of the mobile device. When the device operates in card mode, its NFC module needs to be able to operate even when the battery of the device is discharged or when the telephone function is deactivated, by extracting the power necessary to its operation from the electromagnetic field generated by the reader.

For simplification, reference will be made hereafter to a cell phone as an example of a mobile telecommunication device.

A specificity of cell phones is to use a subscriber identification module (SIM), generally called SIM card, and especially containing the tools and identifiers required by the mobile telephony operator to access to its network. The SIM card communicates with the telephone processor for purposes of identification and authentication of the mobile telephony subscription.

In a contactless communication protocol, there also is a need for an identification and authentication of the communicating devices.

Cell phones integrating (typically, on the same motherboard) the mobile telephony circuits and contactless communication circuits are known. Such a solution is however reserved to top of the line phones due to the cost increase linked to the NFC module. Further, such phones generally only support the reader mode of the NFC protocol.

The developments of the NFC protocol provide for the same subscriber identification module to be sharable by the phone and its NFC module. This amounts to using the SIM card of the telephone for identification and authentication purposes for the near-field communication. The communication protocol (SWP—Single Wire Protocol) between the SIM card and the NFC module is however different from the protocol (set by an ISO standard 7816) used between the SIM card and the telephone processor. A SIM card supporting at least both protocols, and thus an NFC operation, will be designated as SIM-NFC.

To share the same subscriber identification module (the same SIM card) between the phone and its NFC module, and to support the card mode of the NFC protocol, the SIM-NFC card needs to be able to be powered by the NFC module when the telephone is off (or when its processor is deactivated).

It would be desirable to have a mobile telecommunication device using a network of mobile telephony type, also capable of supporting an operation according to the NFC protocol in card mode and in reader mode, controlled by the subscriber identification module of the mobile device.

It would also be desirable for a user to be able to reversibly transform a mobile telecommunication device to give it near-field communication functions.

SUMMARY OF THE INVENTION

An object of the present invention is to overcome all or part of the disadvantages of usual telecommunication devices with an NFC function.

An object of an embodiment of the present invention more specifically aims at enabling a transformation of a mobile device into a mobile device with an NFC module by simply changing its battery.

To achieve all or part of these objects as well as others, at least one embodiment of the present invention provides a mobile telecommunication device comprising:

at least one telecommunication circuit;

at least one subscriber identification module;

at least one assembly comprising at least one supply battery; and a switch of selection between a power supply of the subscriber identification module by said assembly and by said telecommunication circuit according to the presence or not of a near-field communication module in said assembly.

At least one embodiment of the present invention also provides a mobile telecommunication device comprising:

at least one telecommunication circuit;

at least one first connector capable of receiving at least one subscriber identification module; and at least one second connector capable of being connected to an assembly comprising at least one power supply battery, in which the second connector comprises:

at least one first contact connected to at least one first contact of said first connector; and at least one second contact connected to said circuit, said first and second contacts of the second connector being capable of being electrically connected to each other by means of said assembly.

According to an embodiment of the present invention, the interconnection of said contacts depends on the presence or not of a near-field communication module in said assembly.

According to an embodiment of the present invention, said second connector comprises at least one third contact connected to at least one second contact of the first connector.

According to an embodiment of the present invention, the second connector comprises at least one fourth and one fifth contacts connected to said circuit.

According to an embodiment of the present invention, the second connector comprises at least one sixth contact connected to said circuit.

According to an embodiment of the present invention, the device further comprises a mechanical switch of connection of said first and second contacts of the second connector, capable of being actuated by said assembly.

At least one embodiment of the present invention also provides an assembly for such a device, comprising:

at least one battery;

at least one near-field communication module.

At least one embodiment of the present invention also provides an assembly for such a device, comprising at least one battery and at least one element capable of controlling an electric connection between the first and second contacts of the second switch.

According to an embodiment of the present invention, the assembly comprises a mechanical element for actuating said switch.

According to an embodiment of the present invention, the assembly comprises at least one third connector capable of electrically connecting the first and second contacts of the second connector.

The foregoing objects, features, and advantages of the present invention will be discussed in detail in the following non-limiting description of specific embodiments in connection with the accompanying drawings.

BRIEF DESCRIPTION OF THE DRAWINGS

FIGS. 3A and 3B are block diagrams of an embodiment of a mobile telecommunication device capable of supporting an NFC protocol;

FIGS. 6A and 6B are block diagrams of another embodiment of a mobile telecommunication device capable of supporting the NFC protocol.

DETAILED DESCRIPTION

Figure 1:
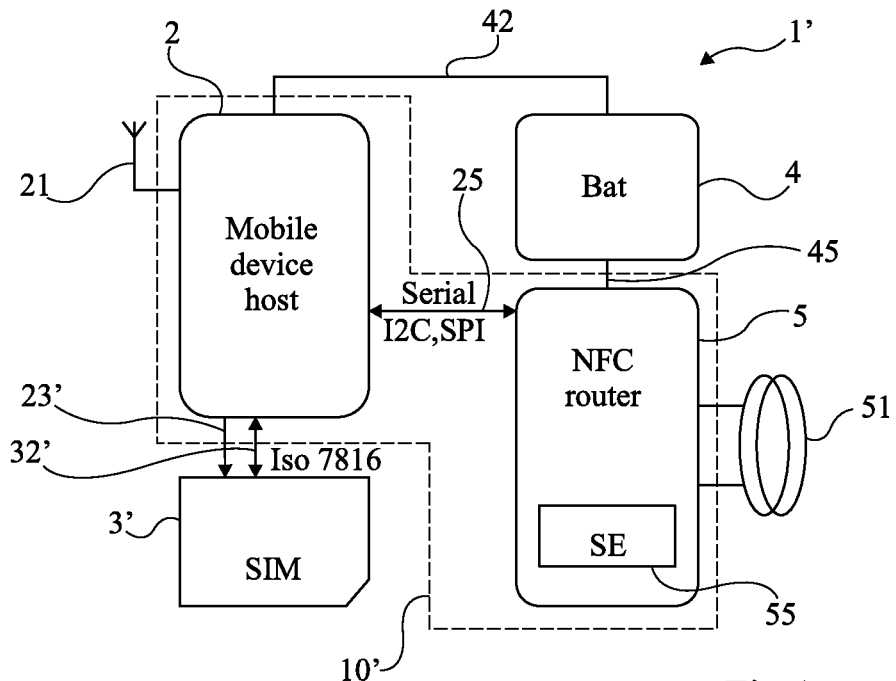
FIG. 1 is a block diagram of an architecture of a usual mobile phone equipped with an NFC module.

The same elements have been designated with the same reference numerals in the different drawings.

For clarity, only those elements which are useful to the understanding of the present invention have been shown and will be described. In particular, neither the circuits specific to the mobile device for establishing the communications on a mobile telephony telecommunication network, nor the circuits of the NFC module for establishing near-field communications have been detailed, the present invention being compatible with usual elements and protocols. Further, the mobile device is generally capable to supporting other functions (for example, data processing, media readers, cameras, GPS, etc.) which will not be detailed, the present invention being here again compatible with any additional current function. For simplification, reference is made to a mobile telephony network to designate the telecommunication network exploited by the mobile device, even if this device only exchanges data (for example, a PDA). Further, although the different embodiments will be described with the example of a cell phone, they generally apply to any mobile telecommunication device.

FIG. 1 is a block diagram illustrating the usual architecture of a cell phone 1' integrating a near-field communication module.

To establish a communication with the mobile telephony network, telephone 1' comprises circuits (block 2, mobile device host) of digital processing (typically, at least one processor) and of communication connected to an antenna 21 adapted to the mobile telephony network. Said circuit(s) 2 also comprise(s) the different parameter, control, and data storage elements as well as at least all the circuits required to implement the telecommunication functions. The identification of telephone 1' by the telephony network is performed by a subscriber identification module 3' (SIM), generally called SIM card. The card is inserted into a dedicated housing providing access (connection 32') to contacts supported by (or connected to) motherboard 10 of the telephone. The SIM card is especially used to parameterize the telephone (telecommunication carrier, telephone number, access code for different networks, etc.). Circuits 2 are powered (connection 42) by a battery 4 (Bat) likely to be recharged by means not shown. The communication between SIM card 3' and circuits 2 is generally performed according to a standardized protocol (for example, known as ISO standard 7816) and card 3' is powered (connection 23') by block 2.

In the example of FIG. 1, motherboard 10' of the telephone integrates both circuits 2 and a near-field communication (NFC) module 5 (NFC router). Router 5 comprises electronic circuits required to transmit and receive near-field data via an antenna 51. Router 5 integrates its own secure identification element 55 (SE).

When it operates in reader mode according to the NFC protocol, router 5 is controlled by processor 2 of telephone 1', generally via a serial link 25 (Serial), for example, of type I2C or SPI. Router 5 is powered (connection 45) by battery 4.

A telephone 1' such as shown in FIG. 1 is capable of operating in card mode, but then does not exploit the resources external to the NFC router. In particular, it is not adapted to sharing a SIM card between processor 2 and the NFC router and thus only partially supports the functionalities offered by the NFC technology, especially the modes controlled by the SIM card over the SWP link.

For a cell phone to be able to share the same subscriber identification module between its mobile telephony circuits and its NFC router, the SIM card needs to support the NFC mode. This SIM-NFC card needs to, in particular, be able to be connected to the NFC router by an SWP link. Further, to operate in card mode, the SIM-NFC card needs to be able to be powered without passing through circuit 2 which may be deactivated (for example, telephone in stand-by or off mode), and even when the battery is discharged.

Figures 2A, 2B:
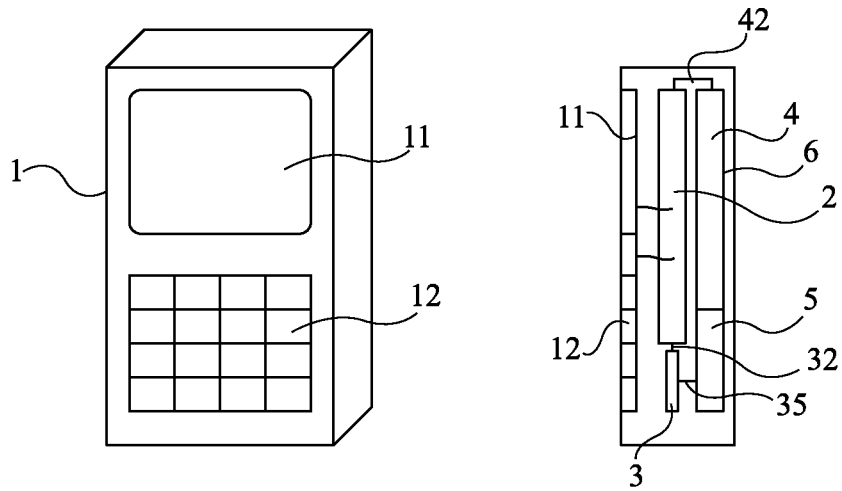
FIGS. 2A and 2B schematically show in front and side view an example of a mobile phone.

FIGS. 2A and 2B are simplified front and side views of an embodiment of a cell phone capable of sharing a SIM-NFC card between its mobile telephony circuits and an NFC module. The telephone generally comprises a display 11 and a keyboard 12 connected to circuits 2 supported by the telephone motherboard. The telephone package comprises a housing for SIM-NFC card 3 and a housing for a removable assembly 6 containing at least one battery 4. This assembly 6, usually designated as "battery pack", may comprise voltage regulation and charge or discharge protection circuits. In the shown embodiment, battery pack 6 further comprises at least one NFC router 5 and its antenna. The connector of the SIM-NFC card further comprises direct connections 35 with a connector (not shown in FIG. 1B) of battery pack 6.

It could have been devised to integrate not only battery 4 and NFC router 5, but also SIM-NFC card 3 (and thus its connector) in battery pack 6 of the telephone. Such a solution would be compatible with an operation in card mode since the SIM card supply may originate from the NFC router to support cases where the NFC router is remotely supplied by the reader with which it communicates. However, such a solution would be irreversible, since the cell phone can only operate with a battery pack equipped with a SIM-NFC card connector. Now, telephone manufacturers often attempt to make their new models compatible with existing batteries. Further, the telephone would then necessarily be used with an NFC router, which amounts once again to dedicate this solution to top of the line telephones (unless specific battery packs only provided with a battery and with a SIM card housing should be created, which would make the system even more complex).

FIGS. 3A and 3B are block diagrams of an embodiment of a cell phone 1 capable of integrating or not an NFC communication module according to the battery pack 6 which is inserted into it. FIG. 3A shows the architecture of the telephone with a battery pack 6 integrating an NFC router 5. FIG. 3B shows this architecture with a battery pack 6' having no NFC router.

As previously, telecommunication circuits 2 communicate with the mobile telephony network via an antenna 21. The telephone motherboard supports (or is connected to) contacts of a SIM-NFC card connector for exchanges between the processor of block 2 and the electronic circuits of the SIM-NFC card according to a protocol defined by standard ISO 7816 (connection 32). However, unlike telephone 1' of FIG. 1, the supply of SIM-NFC card 3 transits through battery pack 6. This functionality is illustrated in FIG. 3A by a connection 23 (VCCsimI) connecting block 2 to pack 6 and by a connection 63 (VCCsimO) connecting battery pack 6 to SIM-NFC card 3. Further, the connector of SIM-NFC card 3 is connected by a connection 53 to the connector of pack 6 to support exchanges according to a single-wire protocol (SWP).

Figure 4:
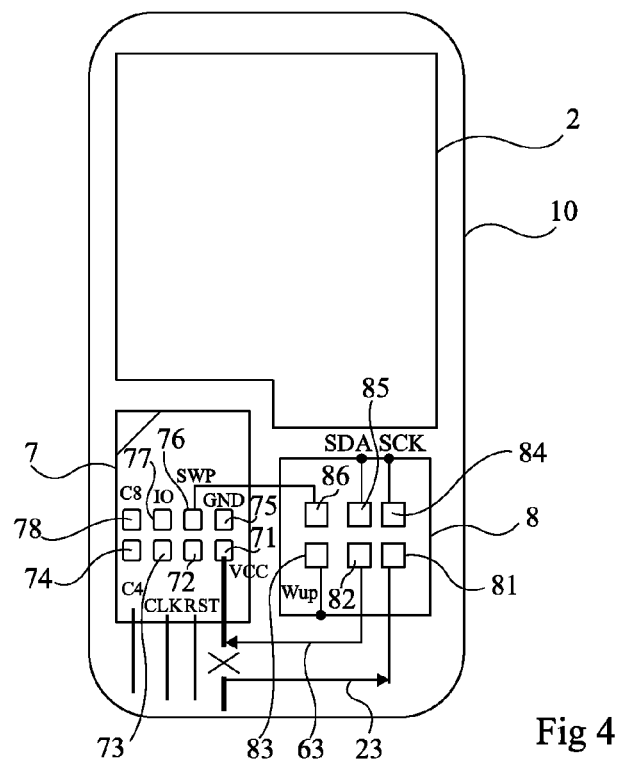
FIG. 4 is a simplified front view of an example of connectors of a mobile phone according to the embodiment of FIGS. 3A and 3B.

FIG. 4 is a simplified front view of an example of a motherboard 10 of telephone 1 supporting circuit(s) 2, a connector 7 of SIM-NFC card 3, and a connector 8 of battery pack 6. Connector 7 comprises eight contacts (as for a SIM card). In addition to supply contacts 71 and 75 (voltage Vcc and ground GND), contacts 72, 73, and 77 of ISO standard 7816 (clock CLK, reset RST, input-output IO) and two free contacts 74 and 78 (C4 and C8), a contact 76 (SWP) is intended for the NFC router. Contact 76 is connected to a contact 86 of connector 8. The latter comprises six contacts, among which, in addition to contact 86, two contact 84 and 85 of serial link 25 (for example, for signals SDA and SCK of the I2C protocol), a contact 83 intended to wake up the telephone when it is in stand-by mode (Wup), and two contacts 81 and 82 respectively connected (connections 23 and 63) to the motherboard to convey signal VCCsimI from circuit 2 and to contact 71 of connector 7. Other contacts, not shown, are present in connector 8. Among these contacts, at least two contacts conveying the battery voltage (Vbat and ground GND) and, preferably, battery charge management contacts, can be found.

The selection between an operation with a standard battery (with no NFC router) or with a battery having an NFC router is performed, in this embodiment, by a connector associated with the battery.

Figure 5A:
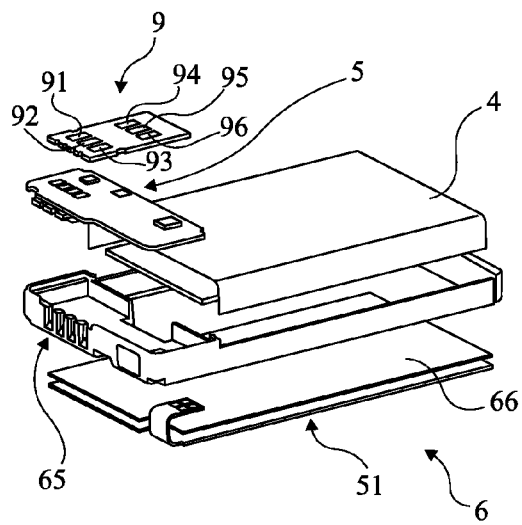
FIGS. 5A and 5B show an embodiment of a mobile phone battery assembly respectively in exploded and assembled perspective view.
Figure 5B:
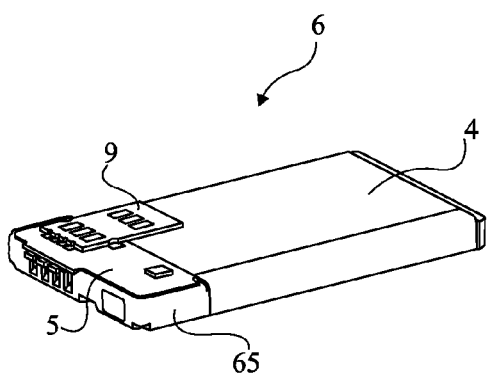

FIGS. 5A and 5B respectively show, in exploded and assembled perspective view, an embodiment of battery pack 6 of FIG. 3A. This assembly or pack comprises a peripheral frame 65 within which are housed one or several batteries 4 and the electronic circuits of router 5. At the arbitrarily-called rear surface, a planar antenna 51 (generally, a planar spiral) is supported by an insulating plate 66 (or a flexible film). Antenna 51 is connected by its ends to the NFC router and forms the inductive element of an oscillating circuit (series or parallel) of the near-field communication system. Finally, at the arbitrarily-called front surface, a connector 9 defines contacts intended to cooperate with those of connector 8 of motherboard 10 (FIG. 4). It should thus be noted that, as compared with a standard battery where battery element 4' (FIG. 3B) takes up then entire volume of the battery pack, the addition of an NFC function generates a slight reduction of the battery capacitance.

Due to the transit of the supply of SIM-NFC card 3 through pack 6, telephone 1 is able to operate not only in reader mode by being supplied by battery 4, but also in card mode by directly supplying its subscriber identification module. For the telephony function, card 3 may further be supplied by circuit 2 due to connections 23 and 63.

According to this embodiment, telephone 1 may be powered by a pack 6' (FIG. 3B) with no NFC router. In this case, connector 9' of pack 6 comprises a conductive bridge 97 between its contacts 91 and 92. Thus, contacts 81 and 82 are connected, which directly connects circuit 2 to SIM-NFC card 3.

An electronic switch may also be integrated in block 2 to select a supply of the SIM-NFC card via the NFC router or from block 2 according to whether the battery pack is or not provided with such a router. Such a solution however requires to ascertain that, in the absence of a power supply provided by the battery, the connection between the SIM-NFC card and the NFC router is establish.

FIGS. 6A and 6B are block diagrams of another embodiment of a cell phone 1 capable of integrating an NFC communication router according to the battery pack 6 which is inserted into it.

With respect to the embodiment of FIGS. 5A and 5B, the difference is that the switching between the version with an NFC router and without NFC router in the battery pack is performed on the side of telephone 1 and not on the battery pack side. However, this switching is always triggered by the type of battery pack inserted into telephone 1. For this purpose, telephone 1 comprises, at the level of connector 8 or at another location of its motherboard, a mechanical switch 87 between connections 23 and 63 conveying the power supply of SIM-NFC card 3. Further, battery pack 6' (FIG. 6B) comprises, in the absence of an NFC router, a pin or another protrusion 67 capable of actuating mechanical switch 87 towards a closed position to connect conductors 23 and 63. As a variation, battery pack 6 (FIG. 6A) provided with an NFC router 5 comprises a mechanical element differentiating it from pack 6' to turn off otherwise-on switch 87.

An advantage of the described embodiments is that the subscriber identification module remains directly inserted in the mobile device. NFC router 5 may however comprise a secure identification element.

Another advantage is that the described embodiments are compatible with a reversible operation of the mobile device according to whether it is equipped with a battery associated or not with an NFC module.

Another advantage is that the device equipped with an NFC router is compatible with an operation in reader mode and in card mode.

Specific embodiments have been described. Various alterations and modifications will occur to those skilled in the art. In particular, the practical implementation of the present invention is within the abilities of those skilled in the art based on the functional indications given hereabove. Further, although the present invention has been described in relation with specific examples of communication protocols internal to the mobile device, it more generally applies whatever the data exchange protocols between the elements internal to the mobile device. Further, each time reference is made to an element, a variation may comprise several similar elements. For example, the battery pack may comprise several NFC routers 5 dedicated to different applications, device 1 may comprise several connectors 7 for receiving several SIM cards, several connectors 8 for receiving several battery packs, etc.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A mobile telecommunication device comprising:
at least one telecommunication circuit;
at least one subscriber identification module;
at least one assembly comprising at least one supply battery; and
a switch of selection between a power supply of the subscriber identification module by said assembly and by said telecommunication circuit according to the presence or not of a near-field communication module in said assembly, wherein the mobile telecommunication device is configured to operate with a first assembly that includes a supply battery but does not include a near-field communication module and with a second assembly that includes a supply battery and a near-field communication module.

2. A mobile telecommunication device comprising:
at least one telecommunication circuit;
at least one first connector capable of receiving at least one subscriber identification module; and
at least one second connector capable of being connected to an assembly comprising at least one power supply battery, wherein the second connector comprises:
at least one first contact connected to at least one first contact of said first connector; and
at least one second contact connected to said circuit,
said first and second contacts of the second connector being capable of being electrically connected to each other by said assembly, wherein the mobile telecommunication device is configured to operate with a first assembly that includes a power supply battery but does not include a near-field communication module and with a second assembly that includes a power supply battery and a near-field communication module.

3. The device of claim 2, wherein the interconnection of said contacts depends on the presence or not of a near-field communication module in said assembly.

4. The device of claim 2, wherein said second connector comprises at least one third contact connected to at least one second contact of the first connector.

5. The device of claim 4, wherein the second connector comprises at least one fourth and one fifth contacts connected to said circuit.

6. The device of claim 5, wherein the second connector comprises at least one sixth contact connected to said circuit.

7. The device of claim 2, further comprising a mechanical switch of connection of said first and second contacts of the second connector, capable of being actuated by said assembly.

8. An assembly for the device of claim 1, comprising:
at least one battery;
at least one near-field communication module.

9. An assembly for the device of claim 2, comprising at least one battery and at least one element capable of controlling an electric connection between the first and second contacts of the second switch.

10. The device of claim 7, comprising a mechanical element for actuating the mechanical switch.

11. The device of claim 2, comprising at least one third connector capable of electrically connecting the first and second contacts of the second connector.

12. A mobile telecommunication device comprising:
a telecommunication circuit;
a subscriber identification module;
a battery pack including at least one battery;
a first supply line from the telecommunication circuit to the battery pack; and
a second supply line from the battery pack to the subscriber identification module wherein, when the battery pack includes a near-field communication module, the near-field communication module controls a voltage from the battery pack to the subscriber identification module on the second supply line and, when the battery pack does not include a near-field communication module, the battery pack includes a connection element configured to effect a connection between the first supply line and the second supply line, wherein the mobile telecommunication device is configured to operate with a first battery pack that includes a battery but does not include a near-field communication module and with a second battery pack that includes a battery and a near-field communication module.

13. A mobile telecommunication device as defined in claim 12, wherein the connection element of the battery pack comprises a conductive bridge between the first supply line and the second supply line.

14. A mobile telecommunication device as defined in claim 12, further comprising a switch that, when closed, connects the first supply line to the second supply line, wherein the connection element of the battery pack comprises a pin or protrusion that actuates the switch to a closed position.

15. A mobile telecommunication device as defined in claim 12, further comprising a serial data connection from the near field communication module to the subscriber identification module when the battery pack includes a near field communication module.

16. A mobile telecommunication device comprising:
a circuit board;
a telecommunication circuit on the circuit board;
a subscriber identification module connector on the circuit board;
a battery pack connector on the circuit board;
a subscriber identification module engaged with the subscriber identification module connector; and
a battery pack engaged with the battery pack connector, wherein the battery pack includes a connection element configured to connect a supply contact of the battery pack connector to a supply contact of the subscriber identification module connector when the battery pack does not include a near-field communication module, wherein the mobile telecommunication device is configured to operate with a first battery pack that includes a battery but does not include a near-field communication module and with a second batter pack that includes a battery and a near-field communication module.

17. A mobile telecommunication device as defined in claim 16, wherein the connection element includes a conductive bridge between the supply contact of the battery pack connector and the supply contact of the subscriber identification module connector.

18. A mobile telecommunication device as defined in claim 16, wherein the near field communication module is configured to control the supply voltage of the subscriber identification module when the battery pack includes a near field communication module.

* * * * *